United States Patent
Saito et al.

(10) Patent No.: US 7,709,084 B2
(45) Date of Patent: May 4, 2010

(54) ANTI-NEWTON RING SHEET AND TOUCH PANEL USING THE SAME

(75) Inventors: Masato Saito, Saitama (JP); Keiichi Kitahara, Kounosu (JP); Masuo Koyama, Ageo (JP); Yoshihisa Kimura, Saitama (JP)

(73) Assignee: Kimoto Co., Ltd (JP)

( * ) Notice: Subject to any disclaimer, the term of this patent is extended or adjusted under 35 U.S.C. 154(b) by 702 days.

(21) Appl. No.: 10/588,951

(22) PCT Filed: Feb. 10, 2005

(86) PCT No.: PCT/JP2005/002078

§ 371 (c)(1), (2), (4) Date: Aug. 10, 2006

(87) PCT Pub. No.: WO2005/077651

PCT Pub. Date: Aug. 25, 2005

(65) Prior Publication Data

US 2007/0184260 A1 Aug. 9, 2007

(30) Foreign Application Priority Data

| Feb. 18, 2004 | (JP) | 2004-040994 |
| Feb. 18, 2004 | (JP) | 2004-040995 |
| Feb. 18, 2004 | (JP) | 2004-040996 |
| Mar. 10, 2004 | (JP) | 2004-067103 |
| Mar. 10, 2004 | (JP) | 2004-067104 |
| Mar. 10, 2004 | (JP) | 2004-067105 |

(51) Int. Cl.
  *B32B 27/32* (2006.01)
  *B32B 5/16* (2006.01)
  *B32B 17/10* (2006.01)
  *G02F 1/133* (2006.01)
  *G06F 3/041* (2006.01)

(52) U.S. Cl. .................. 428/323; 428/220; 428/331; 428/332; 428/339; 349/12; 345/173

(58) Field of Classification Search ............... None
See application file for complete search history.

(56) References Cited

U.S. PATENT DOCUMENTS 6,413,629 B1  7/2002  Kimura (Continued)

FOREIGN PATENT DOCUMENTS

JP  H11-177281  2/1999

*Primary Examiner*—Sheeba Ahmed
(74) *Attorney, Agent, or Firm*—Bacon & Thomas, PLLC

(57) ABSTRACT

There is provided an anti-Newton ring sheet having an excellent anti-sparkle property, which can prevent the generation of sparkles when it is used in a touch panel using a high-definition color display, and a touch panel using this anti-Newton ring sheet.

The anti-Newton ring sheet 1 of the present invention has an anti-Newton ring layer 3 comprising ionizing radiation curable organic-inorganic hybrid resin (binder component 32) and fine particles 31 on one surface of a transparent substrate 2, and preferably the mean diameter and the coefficient of variation of the diameter of the particle 31 is not less than 0.5 μm and not more than 3.0 μm and not less than 20% and not more than 80%, respectively, and the thickness of the anti-Newton ring layer 3 is preferably not less than 0.2 μm and not more than 3.5 μm.

23 Claims, 2 Drawing Sheets

U.S. PATENT DOCUMENTS

| | | | |
|---|---|---|---|
| 2002/0001055 A1* | 1/2002 | Kimura et al. | 349/112 |
| 2002/0005924 A1 | 1/2002 | Kimura | |
| 2003/0180520 A1 | 9/2003 | Saitou et al. | |
| 2003/0180529 A1* | 9/2003 | Nagami | 428/327 |

* cited by examiner

ANTI-NEWTON RING SHEET AND TOUCH PANEL USING THE SAME

FIELD OF THE INVENTION

The present invention relates to an anti-Newton ring sheet. In particular, it relates to an anti-Newton ring sheet which is used for touch panels to be used on a display screen such as CRT, flat panel display and the like.

BACKGROUND OF THE INVENTION

In the fields of photoengraving and optical equipment, there has been an unfavorable problem caused by a Newton ring which occurs when materials such as plastic films and glass plate are brought into close contact. The occurrence of such Newton rings can be prevented by keeping a gap which is produced when materials are brought into contact to a certain width. Therefore, an anti-Newton ring sheet, one or both surfaces of which is treated to become uneven by sand blasting or by an anti-Newton ring layer consisting of a binder component and particles, has been proposed. (See Patent Document 1)

On the other hand, for the materials such as film, glass and the like, which are used for a touch panel on the a display screen such as CRT, flat panel display and the like, the above-mentioned anti-Newton ring sheet also used in order to prevent the production of Newton rings when the touch panel is touched (or pressed).

However, colorization of such CRT and flat panel displays was accompanied by a higher definition color of various displays, and when a conventional anti-Newton ring sheet is used for a touch panel, particles contained in the anti-Newton ring sheet becomes luminescent points and induce a phenomenon called sparkles, and then cause a problem of glare on the color screen.

SUMMARY OF THE INVENTION

Disclosure of the Invention

Problems to be Solved by the Invention

Accordingly, the objective of this invention is to provide an anti-Newton ring sheet, which has an excellent anti-Newton ring property and is unlikely to produce sparkles when used for a touch panel using a high-definition color display, and a touch panel using this anti-Newton ring sheet.

Means for Solving the Problems

In order to achieve the afore-mentioned objectives, inventors of the present invention conducted diligent studies on materials, which can suppress the occurrence of sparkles either or both of the binder and particles, on the anti-Newton ring layer consisting of binder components and particles. As a result, the inventors found that the use of either (1) a specific ionizing radiation curable resin compound, concretely an ionizing radiation curable organic-inorganic hybrid resin or an ionizing radiation curable resin compound which contains a specific amount of other resin components than ionizing radiation curable resin as a binder component, or (2) fine particles with a mean particle diameter of 0.5 µm-3.0 µm and a coefficient of variation of the particle diameter distribution of 20% to 80%, can effectively suppress the generation of sparkles in a high-definition color display while maintaining a high anti-Newton ring property. Thus, the present invention was accomplished.

Namely, the anti-Newton ring sheet of the present invention has an anti-Newton ring layer comprising a binder component and fine particles on one surface of a transparent substrate, wherein the binder component comprises an ionizing radiation curable organic-inorganic hybrid resin (First embodiment). Further, the anti-Newton ring sheet of the present invention has an anti-Newton ring layer comprising a binder component and particles on one surface of a transparent substrate, wherein the binder component comprises an ionizing radiation curable resin compound and other resin component than ionizing radiation curable resin, and the content of the other resin component is 0.1-15 weight % of all solid contents in the binder component (Second embodiment).

In the anti-Newton ring sheet of the present invention, the content of the afore-mentioned fine particles is preferably 0.1-1.0 weight % of all solid contents in the anti-Newton ring layer.

In the anti-Newton ring sheet of the present invention, a mean particle diameter of the afore-mentioned fine particles is preferably 0.5 µm-3.0 µm. More preferably, a coefficient of variation of the particle diameter distribution is 20%-80%.

In the anti-Newton ring sheet of the second embodiment of the present invention, the other resin component is preferably thermoplastic resin, and more preferably the glass transition temperature of the other resin component is 50° C.-120° C.

An anti-Newton ring sheet of the present invention is an anti-Newton ring layer having an anti-Newton ring layer comprising a binder component and fine particles on one surface of a transparent substrate, wherein said binder component is an ionizing radiation curable resin and said fine particles have a mean particle diameter of 0.5 µm-3.5 µm and a coefficient of variation of the particle diameter distribution of 20%-80%(Third embodiment).

In the anti-Newton ring sheet of the present invention, the thickness of said anti-Newton ring sheet is preferably 0.2 µm-3.5 µm.

An anti-Newton ring sheet of the present invention is characterized in that another surface of the afore-mentioned transparent substrate is provided with a hard coat containing particles.

Further, the haze according to JIS K7136:2000 is preferably no more than 20%.

A touch panel of the present invention is a resistive type touch panel, wherein a pair of panels having a conductive film are arranged via spacer so that said conductive film faces each other, and either or both of said conductive film is formed on the anti-Newton ring layer of either of the afore-mentioned anti-Newton ring sheets.

A mean particle diameter and a coefficient of variation of the particle diameter distribution referred to in the present invention are calculated from the values measured by the Coulter Counter method.

The thickness of an anti-Newton ring layer referred herein is a thickness of a resin part in which no protrusions are formed by the fine particles.

An anti-Newton ring sheet of the present invention has an excellent anti-Newton ring property and is unlikely to produce sparkles when it is used for a touch panel using a high-definition color display, thus preventing the generation of glare on a color screen. Therefore, the present invention can provide a touch panel which does not impair the visibility of the display.

PREFERRED EMBODIMENT OF THE INVENTION

Figure 1:
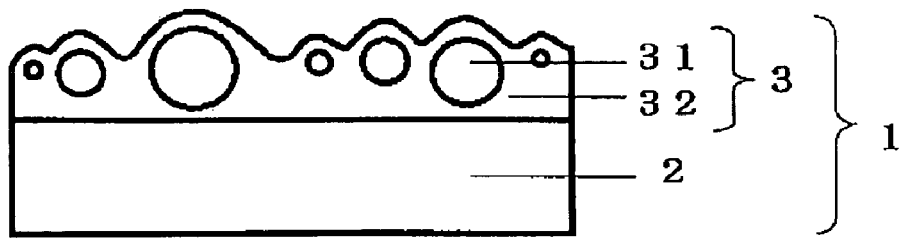
FIG. 1 is a cross-sectional view of an example of the anti-Newton ring sheet of the present invention.

Preferred embodiments of the anti-Newton ring sheet of this invention will be explained hereafter.

The anti-Newton ring sheet of this invention has an anti-Newton ring layer comprising a binder resin and fine particles on one surface of a transparent substrate. Or it has an anti-Newton ring layer comprising a binder component and fine particles on one surface and a hard coat layer on other surface of a transparent substrate. Each component of the anti-Newton ring sheet of the present invention will be explained hereafter.

1. Transparent Substrate

As a transparent substrate on which an anti-Newton ring layer of the present invention is formed, any highly transparent material, such as glass plate, plastic film and the like, can be used. As a transparent plastic film, any material can be used as far as it does not impair transparency. Examples include polyethylene terephthalate, polybutylene terephthalate, polyethylene naphthalate, polycarbonates, polyethylenes, polypropylenes, polystyrenes, triacetyl cellulose, acrylic, polyvinyl chloride and norbornene compounds. Among them, a polyethylene terephthalate film subjected to orienting, in particular, to biaxial orienting is preferably used in view of its superiority in mechanical strength and dimensional stability. It is preferable to use such transparent substrate which has been subjected to any treatment that gives higher adhesiveness, such as plasma treatment, corona discharge treatment, far-ultraviolet irradiation treatment or lining of a layer providing easy adhesion.

The thickness of the transparent substrate is not particularly limited and may be selected suitably for a material to be used, but in terms of its handleability as anti-Newton ring sheet and so forth, it is generally 25 μm-500 μm and preferably 50 μm-300 μm.

2. An Anti-Newton Ring Layer

<Binder Component>

Next, binder components constituting an anti-Newton ring layer is explained.

An anti-Newton ring layer of the present invention uses an ionizing radiation curable resin compound as a binder component. Since the use of an ionizing radiation curable resin compound produces "undulation", which is a wave like uneven configuration, on the surface of the anti-Newton ring layer containing particles, addition of only a small amount of smaller-sized particles can produce uneven surface configuration, thereby preventing the generation of a Newton ring.

Further, because the amount of particles, which cause sparkles, can be thus reduced, the generation of sparkles can be also reduced. On the other hand, however, when "undulation" is formed on the surface of the anti-Newton ring layer, special surface configuration is likely to cause scattering of light of the displayed image, thus inducing the generation of sparkles.

In the present invention, the generation of such sparkles is suppressed by controlling the configuration of the surface which is produced by ionizing radiation curable resin and particles. Specifically, the surface configuration is controlled, either by 1) using ionizing radiation curable organic-inorganic hybrid resin (hereinafter called "hybrid resin") as an ionizing radiation curable resin compound (first embodiment), 2) containing a specific amount of other resin component (hereinafter called "second resin component") as a binder component in addition to the ionizing radiation curable resin compound (second embodiment) or 3) combining an ionizing radiation curable resin compound with specific fine particles (third embodiment). A binder component for each embodiment is explained hereafter.

1) Ionizing Radiation Curable Organic/inorganic Hybrid resin

The ionizing radiation curable organic-inorganic hybrid resin is, unlike conventional typical complexes such as glass fiber reinforced plastic (FRP), characterized by good mixing of organic and inorganic substances at or close to the dispersion level of molecules, and when irradiated by an ionizing radiation, the organic and inorganic components react to form a coating film.

Examples of inorganic components of such hybrid resin include metal oxides such as silica and titanium, among which the use of silica is preferable.

As the silica, there can be exemplified reactive silica, wherein a photosensitive group having photopolymerization reactivity is introduced on the surface. For example, silica, wherein a compound having four groups, such as those expressed in formula (1) and (2) below, hydrolysable silyl group and polymerizing unsaturated group, in a molecule, is chemically bonded through a silyloxy group with pulverized or colloidal silica, a parent substance, by the hydrolytic reaction of the hydrolysable silyl group can be used.

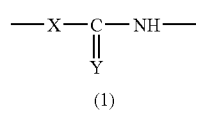

[Chemical formula 1]

(where, X is either of NH, oxygen or sulfur atom, while Y is either of oxygen or sulfur atom. However, when X is oxygen atom, Y is sulfur atom.)

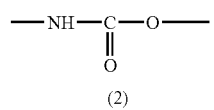

[Chemical formula 2]

Examples of the hydrolysable silyl group include carboxylylate silyl groups such as alkoxysilyl group and acetoxyril group, halogenated silyl groups such as closilyl group, amino silyl group, oxim silyl group and hydride silyl group, etc.

Examples of the polymerizing unsaturated group include acryloyloxy, methcryloyloxy, vinyl, propenyl, butadienyl, styryl, ethynyl, cinnamoyl, malate and acryl amid groups.

Although the diameter of such reactive silica is not particularly limited, the mean particle diameter is preferably 1 nm-100 nm, and more preferably 1 nm-10 nm. By liming the mean particle diameter to such range, transparency of the anti-Newton ring layer containing such particles can be maintained.

Next, examples of the organic components include the compounds having a polymerizing unsaturated group which can be polymerized with the afore-mentioned reactive silica, such as polyvalent unsaturated organic compounds containing two or more polymerizing unsaturated groups in a molecule and monovalent unsaturated organic compounds containing one polymerizing unsaturated group in a molecule.

Examples of the polyvalent unsaturated organic compounds include, concretely, ethylene glycol di(meth)acrylate, diethylene glycol di(meth)acrylate, glycerol di(meth)acrylate, glycerol tri(meth)acrylate, 1,4-butandiol di(meth)acrylate, 1,6-hexandiol di(meth)acrylate, neopentyl glycol di(meth)acrylate, trimethylol propane tri(meth)acrylate, dicyclopentanyl di(meth)acrylate, penta-erythritol tri(meth)acrylate, penta-erythritol tetra(meth)acrylate, dipenta-erythritol hexa(meth)acrylate, dipenta-erythritol monohydroxy penta(meth)acrylate, ditrimethylol propane tetra(meth)acrylate, diethylene glycol di(meth)acrylate, polyethylene glycol di(meth)acrylate, tripropylene glycol di(meth)acrylate, polypropylene glycol di(meth)acrylate, and the like.

Examples of the monovalent unsaturated organic compounds include, concretely, methyl (meth)acrylate, ethyl (meth)acrylate, propyl (meth)acrylate, butyl (meth)acrylate, 2-ethylhexyl (meth)acrylate, isodecyl (meth)acrylate, lauryl (meth)acrylate, stearyl (meth)acrylate, aryl (meth)acrylate, cyclohexyl (meth)acrylate, methylcyclohexyl (meth)acrylate, isobornyl (meth)acrylate, 2-hydroxyethyl (meth)acrylate, 2-hydroxypropyl (meth)acrylate, glycerol (meth)acrylate, glycidyl(meth)acrylate, benzyl (meth)acrylate, 2-ethoxyethyl (meth)acrylate, 2-(2-ethoxyethoxy)ethyl (meth)acrylate, butoxyethyl (meth)acrylate, 2-methoxyethyl (meth)acrylate, methoxydiethylene glycol (meth)acrylate, methoxytriethylene glycol (meth)acrylate, methoxypolyethylene glycol (meth)acrylate, 2-methoxypropyl (meth)acrylate, methoxydipropylene glycol (meth)acrylate, methoxytripropylene glycol (meth)acrylate, methoxypolypropylene glycol (meth)acrylate, polyethyleneglycol (meth)acrylate, polypropyleneglycol (meth)acrylate and the like.

In the ionizing radiation curable organic-inorganic hybrid resin to be used as a binder component of the present invention, the content of inorganic component is preferably 10-50 weight %, and more preferably 20-40 weight %. When the inorganic component of 10 weight % or more is contained, particles, which will be discussed later, can be gathered onto the surface of the anti-Newton ring layer, and an uneven configuration can be produced densely on the surface with only a low content of particles. When the content of the particles is 50 weight % or lower, it becomes easier to keep the transparency of the anti-Newton ring layer containing the particles. Namely, when the content of the inorganic component exceeds 50 weight %, the film is likely to be whitened by the influence of the particles, and the control of optical characteristics of the anti-Newton ring layer containing these particles becomes difficult.

When the hybrid resin is used as a binder component, the particles tend to gather on the surface in the anti-Newton ring layer, and not only the configuration of "undulation" but also dense uneven configurations can be produced on the surface of the anti-Newton ring layer. These dense uneven configurations on the surface can reduce diffusion of light of the displayed image and therefore suppress the generation of sparkles. Also, the dense uneven configurations on the surface can effectively prevent the reflection of a fluorescent light etc. when, for example, the other side of the transparent substrate has a hard coat layer containing the particles, which will be explained later. Further, as the amount of particles to be embedded in the anti-Newton ring layer can be reduced, the generation of Newton rings can be prevented by a smaller content of particles than in the case where non-hybrid type ionizing radiation curable resin is used.

Further, by using hybrid resin as a binder component, the surface of the anti-Newton ring layer becomes mar-resistant against repeated touching (pressing) operations. This may suppress the rise of haze due to mars and prevent the decline of resolution of the displayed image.

2) Ionizing radiation curable resin compound

In the anti-Newton ring sheet of the present invention, an ionizing radiation curable resin compound other than the hybrid type resin is used in combination with the second resin component or specific particles. As an ionizing radiation curable resin compound, a compound containing photopolymerizing pre-polymer, which can be cured by cross-linking generally by the irradiation of ionizing radiation (ultra-violet or electron ray) can be used.

As a photopolymerizing pre-polymer, acrylic pre-polymer which has 2 or more acryloyl groups in a molecule and may have a 3-dimensional network structure by crosslink curing is preferably used. As an acrylic pre-polymer, urethane acrylate, polyester acrylate, epoxy acrylate, melamine acrylate, polyfluoroalkyl acrylate, silicon acrylate and others can be used. Further, these acrylic pre-polymers can be used alone, but in order to improve crosslink curing property and thereby further improve the hardness of the anti-Newton ring layer, it is preferable to add a photopolymerizing monomer.

As photopolymerizing monomer, one or more of monofunctional acryl monomers such as 2-ethylhexyl acrylate, 2-hydroxyethyl acrylate, 2-hydroxypropyl acrylate, butoxyethyl acrylate and the like, bi-functional acryl monomers such as 1,6-hexanediol acrylate, neopentyl glycol diacrylate, diethylene glycol diacrylate, polyethylene glycol diacrylate, hydroxypivalate ester neopentyl glycol diacrylate and the like, and multi-functional acryl monomers, such as dipentaerythritol hexaacrylate, trimethylolpropane triacrylate, penta-erythritol triacrylate and the like are used.

When the ionizing radiation curable resin compound is cured by the ultraviolet irradiation, the use of additives such as photopolymerization initiator or photopolymerization accelerator, together with the above-mentioned photopolymerizing pre-polymers and photopolymerizing monomers, is preferable.

Examples of such photopolymerization initiator include acetophenone, benzophenone, Michler's Ketone, benzoin, benzylmethyl ketal, benzoyl benzoate, α-acyl oxime ester, thioxanthones and the like.

A photopolymerization accelerator is able to quicken a curing speed by alleviating the effect of air to obstruct polymerization in the curing process. Examples of such photopolymerization accelerator include p-dimethylaminobenzoic acid isoamylester, p-dimethylaminobenzoic acid ethylester and the like.

3) Second Resin Component

The second resin component is used in order to moderate the configuration of "undulation" produced on the layer surface by an ionizing radiation curable resin compound and particles. "Undulation" is described as protrusions, wherein the binder components are pulled up by the particles near-by and protrude from the layer surface. By adding the second resin component, the binder component follows more closely to the shape of particles, thereby reducing the height of protrusion from the surface. Thus, the configuration of the surface becomes more controllable.

Examples of such second resin component include thermoplastic and thermosetting resins, such as polyester acrylate resin, polyurethane acrylate resin, epoxy acrylate resin, polyester resin, acrylic resin, polycarbonate resin, epoxy resin, cellulose resin, acetal resin, vinyl resin, polyethylene resin, polystyrene resin, polypropyrene resin, polyamide resin, polyimide resin, melamine resin, phenol resin, silicone resin and fluorine resin.

Among them, the use of thermoplastic resin is preferable in view of its higher controllability of its surface configuration and good handleability. Further, the resin with a glass transition temperature of 50° C.-120° C. is preferable, and that of 65° C.-100° C. is more preferable.

When the glass transition temperature is 50° C. or higher, the configuration of "undulation" can be moderated and the surface configuration becomes more controllable without containing a large amount of the second resin, so that the deterioration of physical properties including surface hardness can be prevented. Further, when the glass transition temperature is 120° C. or less, excessive moderation of the configuration of "undulation" is prevented, and the surface configuration becomes more controllable. Higher the glass transition temperature, the effect to moderate the configuration of "undulation" becomes stronger, so that the amount of other resin to be added can be reduced. However, when the glass transition temperature is excessively high, even a trace amount of additive moderates the configuration of "undulation" sensitively, and makes the control of the surface configuration more difficult.

As the content of the second resin component should differ according to the type and the glass transition temperature of the resin component selected, it is not defined unconditionally. However, it is preferably 0.1-15 weight %, and more preferably 1-8 weight % of all solid contents in the binder component. By containing other resin component at 0.1 weight % or more, the configuration of "undulation" can be moderated. By limiting the content of other resin to 15 weight % or less, the excessive moderation of the configuration of "undulation" can be prevented, so that the deterioration of the physical properties such as surface hardness can be prevented.

Containing a specific amount of the second resin component enables the control of the configuration of the surface and slightly moderates the configuration of "undulation" on the surface of the anti-Newton ring layer. Thus it reduces scattering of light of a displayed image while maintaining the anti-Newton ring property, and suppresses the generation of sparkles. Also, by using the second resin component in the above-mentioned range of content, the surface of the anti-Newton ring layer can be made more mar-resistant against repeated touches (pressings). This can suppress an increase in haze caused by mars to be produced when anti-Newton ring is used in the touch panel, thereby preventing the decline of the resolution of a displayed images on a display.

<Fine Particles>

Next, fine particles to be used for the anti-Newton ring layer of the present invention will be explained. Fine particles are contained in order to prevent the generation of Newton rings by making protrusions of particles on the surface of an anti-Newton ring layer and thereby generate "undulation" on the anti-Newton ring layer as above mentioned.

Types of fine particles are not limited, but examples of such fine particles include inorganic particles such as calcium carbonate, magnesium carbonate, barium sulfate, aluminum hydroxide, silica, kaolin, clay and talc and resin particles such as acrylic resin particles, polystyrene resin particles, polyurethane resin particles, polyethylene resin particles, benzoguanamine resin particles and epoxy resin. Among these particles, spherical particles are used preferably in view of their good handleability and controllability of the configuration of the surface, and resin particles are used preferably in view of their property of not deteriorating the transparency. When hybrid resin is used as a binder component, the fine particles tend to gather onto the surface of the anti-Newton ring layer. Since this phenomenon is significantly prominent when silica particles are used, the use of silica particles is preferable.

The dimension of fine particle is not particularly limited, but the mean diameter of the afore-mentioned particle is preferably 0.5 μm-3.0 μm, and more preferably 1.0 μm-2.5 μm. By using particles having the diameter in this range, an anti-Newton ring sheet capable of further suppressing the generation of sparkles without deteriorating the anti-Newton ring property and transparency can be obtained.

Concretely, by using particles with a mean diameter of not less than 0.5 μm, an uneven configuration with protrusions to be produced by fine particles is formed on the surface of the anti-Newton ring layer to prevent the generation of Newton rings. Further, by using fine particles with a mean diameter of not more than 3.0 μm, scattering of light caused by particles in a displayed image can be made smaller than that when the fine particles with a mean diameter of 3.0 μm or larger are used, so that the generation of sparkles is further suppressed.

Further, regardless of the dimension of fine particles, the coefficient of variation of the particle diameter distribution is preferably 20%-80%, more preferably 30%-70%, and most preferably 40%-60%. The coefficient of variation of the particle diameter distribution indicates the degree of variation of particle diameter distribution, or a quotient (in %age) obtained by dividing standard deviation by mean particle diameter {coefficient of variation=(square root of unbiased variance/(arithmetic mean value)×100%}.

Unlike monodisperse spherical particles having a uniform particle diameter, the fine particles with a coefficient of variation of the particle diameter distribution of 20% or more prevents uniform scattering of light of the displayed image on the surface of an anti-Newton ring layer, and suppresses the generation of sparkles effectively. The fine particles having a coefficient of variation of the particle diameter distribution of 80% or lower can maintain transparency and further suppress the generation of sparkles since the fine particles which increase scattering of light of a displayed image can be excluded.

In particular, the fine particles having a mean diameter of 0.5 μm-3.0 μm and a coefficient of variation of the particle diameter distribution of 20-80% are used, the above-mentioned effect to suppress the generation of sparkles is obtained even if general ionizing radiation curable resin compound is used alone.

The content of fine particles is not limited but is preferably 0.1-1.5 weight %, and more preferably 0.1-1.0 weight % of the total solid content comprising an anti-Newton ring layer. With the content of fine particles of 0.1 weight % or more, an excellent anti-Newton ring property can be obtained. The reason why the content is limited to 1.5 weight % is that the content exceeding this percent may not further improve the anti-Newton ring property but deteriorate the transparency and cause the generation of sparkles.

<Other Additives>

An anti-Newton ring layer may contain, in addition to the afore-mentioned binder components and fine particles and as far as it does not impair their effects, other resins and various additives such as photopolymerization initiator, photopolymerization accelerator, lubricant, fluorescent brightening agent, pigment, antistatic agent, fire retardant, antibacterial agent, fungicide, ultraviolet [UV] absorber, light stabilizer, antioxidant, plasticizer, leveling agent, flow control agent, defoaming agent, dispersing agent, mold-releasing agent and cross-linking agent.

<Anti-Newton ring layer>

A coating solution for an anti-Newton ring layer is prepared by mixing above-mentioned binder component, fine particles and other resin, additives and diluting solvent, as required, applied on at lease one surface of the aforementioned transparent substrate by the known coating method, including, for example, bar coater, die coater, blade coater, spin coater, roll coater, Gravure coater, flow coater, spraying and screen printing, dried and then cured by the irradiation of ionizing radiation. Thus an anti-Newton ring layer can be formed.

In the irradiation of ionizing radiation, an ultraviolet light in the wavelength range of 100 nm-400 nm, or preferably 200 nm-400 nm, emitted from an ultra high pressure mercury vapor lamp, high pressure mercury vapor lamp, low pressure mercury vapor lamp, carbon arc or methyl halide lump, or an electron beam with a wavelength of 100 nm or less emitted from a scanning or curtain electron accelerator is used.

The surface hardness of an anti-Newton ring layer is not particularly limited and may differ depending on the property of the selected transparent substrate. Therefore, though it cannot be defined unconditionally, the hardness is preferably H or harder or more preferably 2H or harder in the pencil hardness degree according to JIS K5600-5-4:1999.

The thickness of the afore-mentioned anti-Newton ring layer is preferably 0.2 μm-3.5 μm or more preferably 0.5 μm-3.0 μm when the particles in the above-mentioned size are used. The anti-Newton ring layer having a thickness of 0.2 μm or more prevents the fine particles to fall off the anti-Newton ring layer and gives a minimum requisite surface hardness. In the anti-Newton ring layer having a thickness of 3.5 μm or less, uneven configuration is produced on the surface of the anti-Newton ring layer by producing protrusions on the surface at least by part of the fine particles, thus preventing the generation of Newton rings. In particular, hybrid resin used as a binder component prevents the fine particles whose diameter is smaller than the thickness of the anti-Newton ring layer to be embedded in the layer, so that the dense uneven configuration can be formed on the surface. On the surface with such dense uneven configuration, scattering of the light of the displayed image can be mutually cancelled out, so that the generation of sparkles is further suppressed.

Such uneven configuration on the anti-Newton ring layer, although not particularly limited, preferably has Ra of not smaller than 0.07 μm but not larger than 0.3 μm, and Rsm of not larger than 150 μm according to JIS-B0601:2001.

Further, regardless of the size of the fine particles, the thickness of the anti-Newton ring layer is preferably 20%-80% and more preferably 40%-80% of the mean particle diameter. The anti-Newton ring layer having a thickness that is 20% or more of the mean particle diameter can prevent particles to fall off from the layer and gives a minimum requisite surface hardness. Further, by using an anti-Newton ring layer having a thickness of 80% or less of the mean particle diameter, the shape of the protrusions produced by particles on the surface can be figured so that scattering of lights of the displayed image can be mutually canceled. Further, many such protrusions can be produced on the anti-Newton ring layer, so that the generation of Newton rings can be prevented.

The thickness of the anti-Newton ring layer here is the thickness of the resin, in which no protrusion is formed by fine particles.

The anti-Newton ring of the present invention thus produced preferably has a haze according to JIS K7136:2000 of less than 3.0%.

3. Hard Coat Layer

The hard coat layer can be formed on the surface of a transparent substrate, on which the afore-mentioned anti-Newton ring layer is not formed.

In general, a hard coat is formed on the surface to be touched of the anti-Newton ring sheet used for a touch panel, in order to prevent marring on the surface. For the anti-Newton ring sheet of the present invention, it is possible to form a hard coat layer similar to the conventional hard coat layer. However, there is a problem that the light of fluorescent lamp is reflected on the surface of the sheet on which a conventional hard coat is formed. Accordingly, the anti-Newton ring sheet of the present invention shall have a hard coat layer, which preferably contains particles.

Such hard coat layer prevents marring by nails on the surface when used as a touch panel, as well as effectively prevents the reflection of light of fluorescent lamp and the like by the synergic effect with the afore-mentioned anti-Newton ring layer.

As the fine particles to be contained in the hard coat layer, a mixture of one or more types of fine particles similar to those used for the afore-mentioned anti-Newton ring layer can be used. Further, in view to suppress the generation of sparkles, the dimension of fine particles and the coefficient of variation of the particle diameter distribution are preferably in the ranges similar to the above-mentioned range, but are not limited to them. The content of fine particles differ depending on the type of binder component which contains fine particles, which will be discussed later, and the thickness of the hard coat layer, and is not particularly limited, but is preferably 2-20 parts by weight, more preferably 4-18 parts by weight and further more preferably 6-16 parts by weight based on 100 parts by weight of the solid content of the binder component. The content of fine particles in these ranges can reduce the haze according to JIS K7136:2000 to 20% or less, and further 10% or less, thus the effect to prevent reflection of light is exhibited, while maintaining transparency.

As a binder component for containing fine particles, the use of mainly thermosetting resin or ionizing radiation curable resin is preferable. In particular, in view of the ability to produce the afore-mentioned "undulation", and render an effect to prevent the reflection of light while maintaining transparency and excellent anti-marring effect, the use of ionizing radiation curable resin is preferable.

As ionizing radiation curable resin, resin similar to that used for the anti-Newton ring layer can be used, and the use of the afore-mentioned ionizing radiation curable organic-inorganic hybrid resin is also preferable. Further, various additives similar to those used for the above-mentioned anti-Newton ring layer can be contained as far as they do not deteriorate the function of the present invention.

The hard coat layer can be formed on the opposite surface to the one on which the anti-Newton ring layer is formed on the afore-mentioned transparent substrate, wherein a coating solution is prepared by mixing the afore-mentioned fine particles, binder component and, where appropriate, additives and diluting solvent, applied and dried according to the above-mentioned publicly known conventional coating method, and cured, if necessary, by heating or by irradiating ionizing radiation as mentioned above. Further, the anti-Newton ring sheet of the present invention can be produced, as explained above, from either the anti-Newton ring layer or the hard coat layer.

Figure 2:
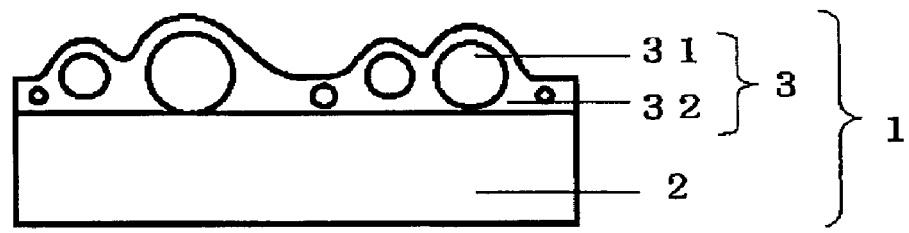
FIG. 2 is a cross-sectional view of another example of the anti-Newton ring sheet of the present invention.
Figure 3:
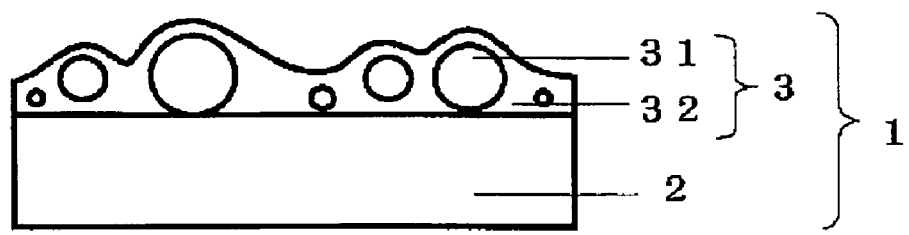
FIG. 3 is a cross-sectional view of another example of the anti-Newton ring sheet of the present invention.

The cross sectional views of the anti-Newton ring sheet of the present invention, as explained above, are shown in FIG. 1-3. FIG. 1 shows the first embodiment of the anti-Newton ring sheet. FIG. 2 shows the second embodiment of the anti-Newton ring sheet. FIG. 3 shows the third embodiment of the anti-Newton ring sheet. In these figures, symbols 1, 2 and 3 indicate the anti-Newton ring sheet, the transparent substrate and the anti-Newton ring layer, respectively, while symbols 31 and 32 indicate fine particles and binder, respectively.

As shown in FIG. 1, the anti-Newton ring sheet of the first embodiment can produce an anti-Newton ring effect even the content of particles is low, due to the use of ionizing radiation curable organic-inorganic hybrid resin as a binder component of the anti-Newton ring layer. Also, when it is used for a touch panel using a high definition color display, since the uneven configuration to be formed densely on the surface suppresses the generation of sparkles, a glare-less touch panel can be produced. Further, the deterioration of transparency as an anti-Newton ring sheet can be suppressed because of the low content of fine particles, so that the displayed image is clearly visible when it is used in the above-mentioned touch panel.

Figure 4:
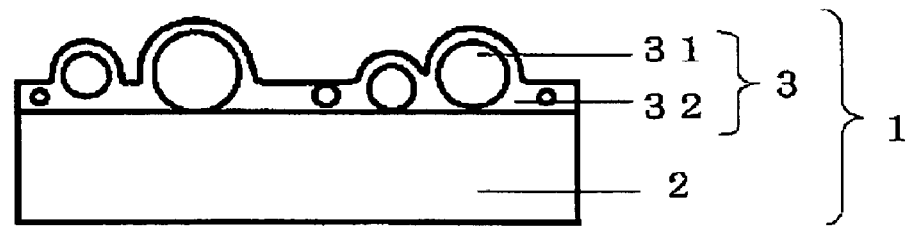
FIG. 4 is a cross-sectional view of another anti-Newton ring sheet.
Figure 5:
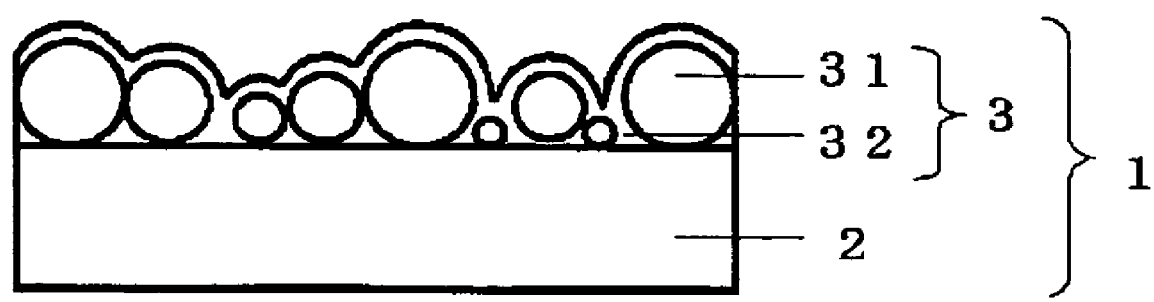
FIG. 5 is a cross-sectional view of another anti-Newton ring sheet.

On the other hand, when thermosetting resin or thermoplastic resin is used as a binder component of the anti-Newton ring layer, for example, since no "undulation" is formed on the anti-Newton ring layer, as shown in FIG. 4, no anti-Newton ring effect is obtained. In order to make a surface configuration capable of preventing the generation of Newton rings, the particle having a larger diameter should be contained more, as shown in FIG. 5. However, the anti-Newton ring sheet thus produced can neither maintain transparency nor sufficiently suppress the generation of sparkles.

When other ionizing radiation curable resin than the hybrid resin is used as a binder component, "undulation" are generated on the surface of the anti-Newton ring layer, so that even a low content of fine particles may prevent the generation of Newton rings. However, since the fine particles do not gather onto the surface of the anti-Newton ring layer but are buried in the layer, sparkles are likely to be generated due to the configuration of "undulation".

On the other hand, in the anti-Newton ring sheet of the second embodiment shown in FIG. 2 the surface configuration formed by the ionizing radiation curable resin compound can be adjusted by using a mixture of an ionizing radiation curable resin compound and the second resin compound as a binder component of the anti-Newton ring layer in a certain ratio. Accordingly, light scattering of the displayed image can be reduced, and thereby a similar anti-Newton ring effect to that of the anti-Newton ring sheet of the first embodiment can be obtained.

In respect of the anti-Newton ring sheet of the third embodiment which uses specific fine particles, because the surface configuration formed by the ionizing radiation curable resin can be adjusted as shown in FIG. 3, a similar anti-Newton ring effect to those of the anti-Newton ring sheets of the first and second embodiments can be obtained.

Though it is not illustrated in the figure, by forming a hard coat layer containing particles on other surface of the transparent substrate, an anti-Newton ring sheet with an excellent effect to prevent the reflection of lights such as fluorescent light can be obtained.

Next, the examples of such touch panel of the present invention will be explained.

A touch panel of the present invention is of the resistive membrane type, wherein a pair of panels having conductive films on the surface are placed via spacer so that the afore-mentioned conductive films face each other, and either or both of the conductive films is formed on the anti-Newton ring layer of the anti-Newton ring sheet of the present invention.

Concretely, at least one of the pair of the panels comprises the above-mentioned anti-Newton ring sheet, or at least one of the pair of the panels is provided with an anti-Newton ring layer. When only one of the panels has an anti-Newton ring layer, the layer can be provided either on the front surface (a surface to be touched) or the inside. In either case, anti-Newton ring property is obtained, and when it is used in the touch panel using a high definition color display, the generation of sparkles is suppressed. In this case, what is similar to the transparent substrate detailed in association with the anti-Newton ring sheet of the present invention can be used as other panel. Further, it is preferable to apply any hard coat treatment (for example, application of a hard coat layer or affixation of a hard coat film) on the surface to be touched of the panel. When the anti-Newton ring sheet of the present invention is used for the panel on the side to be touched, the panel having a hard coat layer may be used.

Example of the conductive films include conductive and transparent thin inorganic membranes, made of metals such as In, Sn, Au, Al, Cu, Pt, Pd, Ag and Rh and metal oxides such as indium oxide and tin oxide, complex oxides thereof, ITO, and thin organic membrane made of conductive aromatic polymers such as polyparaphenylene, polyacetylene, polyaniline, polythiophen, polyparaphenylene vinylene, polypyrol, polyfuran, polyselenophene and polypyridine.

Such conductive films are formed on one surface of a transparent substrate or on the surface of an anti-Newton ring layer using the vacuum film-making method such as vacuum deposition, spattering and ion plating as a thin inorganic film, or using known conventional coating methods as those used for the anti-Newton ring layer as an organic thin film.

Spacer is formed to ensure a gap between a pair of panels when the panels are made into a pair, to control the load applied when the panel is touched and to make the panels separable easily from each other after being touched. Such spacer is generally made of transparent ionizing radiation curable resin and can be obtained by producing fine dots of the resin by the photo processing. Also, the spacer can be formed of urethane resin and the like by printing a large number of dots using a printing method such as silk screen. The spacer can be obtained also by spraying or applying an inorganic or organic particle-dispersed solution and drying it. The size of the spacer cannot be defined specifically because it differs according to the size of the touch panel, but the spacer is produced generally as the dots having a diameter of 30 μm-100 μm and a height of 1 μm-15 μm and are arranged at 0.1 μm-15 μm intervals.

The touch panel of the present invention has excellent anti-Newton ring property and transparency, and does not deteriorate the visibility of a display because the panel comprises a conductive film-covered anti-Newton ring layer on which sparkles are unlikely to be generated.

EXAMPLES

Examples of the present invention will be explained in detail hereinafter. In the following examples, "part" and "%" are used on a weight basis unless otherwise indicated.

1. Production of an Anti-Newton Ring Sheet

Example 1

A coating solution for an anti-Newton ring layer having the following formulation was applied to one surface of a polyester film (COSMOSHINE A4300: Toyobo Co., Ltd.) having a thickness of 188 µm, as a transparent substrate, dried and irradiated with ultraviolet light using a high pressure mercury vapor lamp to form an anti-Newton ring layer having a thickness of about 1.5 µm. Thus the anti-Newton ring sheet of Example 1 was produced.

<Formulation of a Coating Solution for an Anti-Newton Ring Layer of Example 1>

| | |
|---|---|
| Ionizing radiation curable organic-inorganic hybrid resin (Solid content 50%) (Inorganic content 38%) (Desolite 7503: JSR Corporation) | 100 parts |
| Fine particles (Acrylic resin particles) (Mean particle diameter 2 µm) (Coefficient of variation 50%) | 0.2 parts |
| Isopropyl alcohol | 150 parts |

Example 2

An anti-Newton ring sheet of Example 2 was produced in the same manner as in Example 1 except that the fine particles in the coating solution for an anti-Newton ring layer of Example 1 were substituted for the acrylic resin particles having a mean particle diameter of 2 µm and a coefficient of variation of 33%.

Example 3

An anti-Newton ring sheet of Example 3 was produced in the same manner as in Example 1 except that the fine particles in the coating solution for an anti-Newton ring layer of Example 1 were substituted for the acrylic resin particles having a mean particle diameter of 9 µm and a coefficient of variation of 22%, and that an anti-Newton ring layer having a thickness of 7 µm was formed.

Example 4

A coating solution for an anti-Newton ring layer having the following formulation was applied to one surface of a transparent substrate composed of polyester film (Cosmoshine A4300: Toyobo Co., Ltd.) having a thickness of 188 µm, dried and irradiated with ultraviolet light using a high pressure mercury vapor lamp to form an anti-Newton ring layer having a thickness of about 1.5 µm. Thus the anti-Newton ring sheet of Example 4 was produced. As other resin component [a], thermoplastic resin (Vylon 296: Toyobo Co., Ltd.) having a glass transition temperature of 71° C. was added in an amount of 7% of all solid contents of the binder component.

<Formulation of a Coating Solution for an Anti-Newton Ring Layer of Example 4>

| | |
|---|---|
| Ionizing radiation curable resin compound (Solid content 100%) (Beamset 575: Arakawa Chemical Industries, Ltd.) | 46.5 parts |
| Other resin component [a] (solid content 100%) | 3.5 parts |
| Fine particles (Acrylic resin particles) (Mean particle diameter 2 µm) (Coefficient of variation 50%) | 0.4 parts |
| Isopropyl alcohol | 200 parts |

Example 5

An anti-Newton ring sheet of Example 5 was produced in the same manner as in Example 4 except that the coating solution for an anti-Newton ring layer of Example 4 was substituted for the coating solution having the following formulation. Further, as other resin component [b], thermoplastic resin (Vylon 240: Toyobo Co., Ltd.) having a glass transition temperature of 60° C. was added in an amount of 10% of all solid contents of the binder component.

<Formulation of a Coating Solution for an Anti-Newton Ring Layer of Example 5>

| | |
|---|---|
| Ionizing radiation curable resin compound (Solid content 100%) (Beamset 575: Arakawa Chemical Industries, Ltd.) | 45 parts |
| Other resin component [b] (solid content 100%) | 5 parts |
| Fine particles (Acrylic resin particles) (Mean particle diameter 2 µm) (Coefficient of variation 50%) | 0.4 parts |
| Isopropyl alcohol | 200 parts |

Example 6

An anti-Newton ring sheet of Example 6 was produced in the same manner as in Example 4 except that the coating solution for an anti-Newton ring layer of Example 4 was substituted for the coating solution for an anti-Newton ring layer having the following formulation. Further, as other resin component [c], thermoplastic resin (Thermolac LP45M: Soken Chemical and Engineering Co., Ltd.) having a glass transition temperature of 105° C. was added in an amount of 3% of all solid contents of the binder component.

<Formulation of a Coating Solution for an Anti-Newton Ring Layer of Example 6>

| | |
|---|---|
| Ionizing radiation curable resin compound (Solid content 100%) (BEAMSET 575: Arakawa Chemical Industries, Ltd.) | 48.5 parts |
| Other resin component [c] (solid content 40%) | 3.8 parts |
| Fine particles (Acrylic resin particles) (Mean particle diameter 2 µm) (Coefficient of variation 50%) | 0.4 parts |
| Methylethyl ketone | 200 parts |

Example 7

An anti-Newton ring sheet of Example 7 was produced in the same manner as in Example 4 except that the coating solution for an anti-Newton ring layer of Example 4 was substituted for the coating solution for an anti-Newton ring layer having the following Formulation, and then cured at 60° C. for 48 hours. Further, as other resin component [d], thermosetting resin (Acrydick A808: Dainippon Ink and Chemicals Inc.) having a glass transition temperature of 70° C. was added in an amount of 7% of all solid contents in the binder component.

<Formulation of a Coating Solution for an Anti-Newton Ring Layer of Example 7>

| | |
|---|---|
| Ionizing radiation curable resin compound (Solid content 100%) (BEAMSET 575: Arakawa Chemical Industries, Ltd.) | 46.5 parts |
| Other resin component [d] (solid content 50%) | 7 parts |
| Cross-linking agent (polyisocyanate) (solid content 60%) (TAKENATE D110N: Mitsui Takeda Chemicals Inc.) | 1 part |
| Fine particles (Acrylic resin particles) (Mean particle diameter 2 μm) (Coefficient of variation 50%) | 0.4 parts |
| Methylethyl ketone | 200 parts |

Example 8

An anti-Newton ring sheet of Example 8 was produced in the same manner as in Example 4 except that the fine particles in the coating solution for an anti-Newton ring layer of Example 4 were substituted for the acrylic resin particles having a mean particle diameter of 2 μm and a coefficient of variation of 33%.

Example 9

An anti-Newton ring sheet of Example 9 was produced in the same manner as in Example 4 except that the fine particles in the coating solution for an anti-Newton ring layer of Example 4 were substituted for the acrylic resin particles having a mean particle diameter of 5 μm and a coefficient of variation of 30% and that an anti-Newton ring layer having a thickness of 4 μm was formed.

Example 10

A coating solution for an anti-Newton ring layer having the following formulation was applied to one surface of a transparent substrate consisting of polyester film (Cosmoshine A4300: Toyobo Co., Ltd.) having a thickness of 188 μm, dried and irradiated with ultraviolet light using a high pressure mercury vapor lamp to form an anti-Newton ring sheet having a thickness of about 1.5 μm. Thus the anti-Newton ring sheet of Example 10 was produced.

<Formulation of a Coating Solution for an Anti-Newton Ring Layer of Example 10>

| | |
|---|---|
| Ionizing radiation curable resin compound (Solid content 100%) (BEAMSET 575: Arakawa Chemical Industries, Ltd.) | 50 parts |
| Fine Particles (Acrylic resin particles) (Mean particle diameter 2 um) (Coefficient of variation 50%) | 0.4 parts |
| Isopropyl alcohol | 200 parts |

Example 11

An anti-Newton ring sheet of Example 11 was produced in the same manner as in Example 10 except that the fine particles in the coating solution for an anti-Newton ring layer of Example 10 were substituted for the acrylic resin particles having a mean particle diameter of 1 μm and a coefficient of variation of 65%, and that an anti-Newton ring layer having a thickness of 0.7 μm was formed.

Example 12

An anti-Newton ring sheet of Example 12 was produced in the same manner as in Example 10 except that the fine particles in the coating solution for an anti-Newton ring layer of Example 10 were substituted for the acrylic resin particles having a mean particle diameter of 3 μm and a coefficient of variation of 42% and that an anti-Newton ring layer having a thickness of 2.4 μm was formed.

Example 13

An anti-Newton ring sheet of Example 13 was produced in the same manner as in Example 10 except that the fine particles in the coating solution for an anti-Newton ring layer of Example 10 were substituted for the acrylic resin particles having a mean particle diameter of 2 μm and a coefficient of variation of 33%.

Comparative Example 1

A coating solution for an anti-Newton ring layer having the following formulation was applied to one surface of a polyester film as in Example 1, dried to form an anti-Newton ring layer having a thickness of 1.5 μm and then cured for 48 hours at 60° C. Thus the anti-Newton ring sheet of the Comparative Example 1 was produced.

<Formulation of a Coating Solution for an Anti-Newton Ring Layer of Comparative example 1>

| | |
|---|---|
| Thermosetting resin (acrylic resin) (solid content 50%) (ACRYDICL A807: Dainippon Ink and Chemicals Inc.) | 81 parts |
| Cross-linking agent (polyisocyanate) (solid content 60%) (TAKENATE D110N: Mitsui Takeda Chemicals Inc.) | 16 parts |
| Fine particles (Acrylic resin particles) (Mean particle diameter 2 μm) (Coefficient of variation 50%) | 0.2 parts |
| Methylethyl ketone | 77 parts |
| Toluene | 76 parts |

Comparative Example 2

An anti-Newton ring sheet of Comparative Example 2 was produced in the same manner as in Comparative Example 1 except that the fine particles in the coating solution for an anti-Newton ring layer of Comparative Example 1 were substituted for the acrylic resin particles having a mean particle diameter of 9 μm and a coefficient of variation of 22% and that an anti-Newton ring layer having a thickness of 7 μm was formed.

Comparative Example 3

An anti-Newton ring sheet of Comparative Example 3 was produced in the same manner as in Comparative Example 2 except that the amount of particles added into the coating solution for the anti-Newton ring layer of Comparative Example 2 was substituted for 5 parts.

Reference Example 1

An anti-Newton ring sheet of Reference example 1 was produced in the same manner as in Example 4 except that the coating solution for the anti-Newton ring layer of Example 4 was substituted for the coating solution for an anti-Newton ring layer having the following formulation. Further, as other resin component [a], thermoplastic resin having a glass transition temperature of 71° C. was added, as mentioned above, in an amount of 20% of all solid contents in the binder component.

<Formulation of a Coating Solution for an Anti-Newton Ring Layer of Reference Example 1>

| | |
|---|---|
| Ionizing radiation curable resin compound (Solid content 100%) (BEAMSET 575: Arakawa Chemical Industries, Ltd.) | 40 parts |
| Other resin component [a] (Solid content 100%) | 10 parts |
| Fine particles (Acrylic resin particles) (Mean particle diameter 2 μm) (Coefficient of variation 50%) | 0.4 parts |
| Isopropyl alcohol | 200 parts |

Reference Example 2

An anti-Newton ring sheet of Reference Example 2 was produced in the same manner as in Example 4 except that the coating solution for an anti-Newton ring layer of Example 4 was substituted for the coating solution for an anti-Newton ring layer having the following formulation. Further, as other resin component [a], thermoplastic resin having a glass transition temperature of 71° C. was added, as mentioned above, in an amount of 0.06% of all solid contents in the binder component.

<Formulation of a Coating Solution for an Anti-Newton Ring Layer of Reference Example 2>

| | |
|---|---|
| Ionizing radiation curable resin compound (Solid content 100%) (BEAMSET 575: Arakawa Chemical Industries, Ltd.) | 50 parts |
| Other resin component [a] (Solid content 100%) | 0.03 parts |
| Fine particles (Acrylic resin particles) (Mean particle diameter 2 μm) (Coefficient of variation 50%) | 0.4 parts |
| Isopropyl alcohol | 200 parts |

An anti-Newton ring sheet of Reference Example 3 was produced in the same manner as in Example 4 except that the coating solution for an anti-Newton ring layer of Example 4 was substituted for the coating solution for an anti-Newton ring layer having the following formulation. Further, as other resin component [e], thermoplastic resin having a glass transition temperature of 20° C. (Vylon GK140: Toyobo Co., Ltd.) was added in an amount of 20% of all solid contents in the binder component.

<Formulation of a Coating Solution for an Anti-Newton Ring Layer of Reference example 3>

| | |
|---|---|
| Ionizing radiation curable resin compound (Solid content 100%) (BEAMSET 575: Arakawa Chemical Industries, Ltd.) | 40 parts |
| Other resin component [e] (Solid content 100%) | 10 parts |
| Fine particles (Acrylic resin particles) (Mean particle diameter 2 μm) (Coefficient of variation 50%) | 0.4 parts |
| Methylethyl ketone | 200 parts |

Reference Example 4

An anti-Newton ring sheet of Reference Example 4 was produced in the same manner as in Example 4 except that the coating solution for an anti-Newton ring layer of Example 4 was substituted for the coating solution for an anti-Newton ring layer having the following formulation. Further, as other resin component [f], thermoplastic resin having a glass transition temperature of 260° C. (Vylomax HR15ET: Toyobo Co., Ltd.) was added in an amount of 0.06% of all solid contents in the binder component.

<Formulation of a Coating Solution for an Anti-Newton Ring Layer of Reference Example 4>

| | |
|---|---|
| Ionizing radiation curable resin compound (Solid content 100%) (BEAMSET 575: Arakawa Chemical Industries, Ltd.) | 50 parts |
| Other resin component [f] (Solid content 100%) | 0.03 parts |
| Particles (Acrylic resin particles) (Mean particle diameter 2 μm) (Coefficient of variation 50%) | 0.4 parts |
| Methylethyl ketone | 200 parts |

Comparative Example 1

An anti-Newton ring sheet of Comparative example 4 was produced in the same manner as in Example 10 except that the fine particles in the coating solution for an anti-Newton ring layer of Example 10 were substituted for the acrylic resin particles having a mean particle diameter of 9 μm and a coefficient of variation of 22% and that an anti-Newton ring layer having a thickness of 7 μm was formed.

Comparative Example 5

An anti-Newton ring sheet of Comparative Example 5 was produced in the same manner as in Example 10 except that the fine particles in the coating solution for an anti-Newton ring layer of Example 10 were substituted for the acrylic resin particles having a mean particle diameter of 3 μm and a coefficient of variation of 95%.

Comparative Example 6

An anti-Newton ring sheet of Comparative Example 6 was produced in the same manner as in Example 10 except that the fine particles in the coating solution for an anti-Newton ring layer of Example 10 were substituted for the acrylic resin particles having a mean particle diameter of 2 μm and a coefficient of variation of 5%.

2. Production of a Touch Panel (1) Production of an Upper Electrode Panel

An upper electrode panels was produced by forming a conductive ITO film having a thickness of about 20 nm by the spattering method on the anti-Newton ring layer of the anti-Newton ring sheet of the above-mentioned Examples 1-13, Comparative Examples of 1-6 and Reference Examples 1-4 respectively and laminating a hard coat film (KB film N05S: Kimoto Co., Ltd.) via adhesive on other surface, and by cutting off a 4-inch rectangular panel (87.3 mm long×64.0 mm wide).

(2) Production of a Lower Electrode Panel

A lower electrode panel was produced by forming a conductive ITO film having a thickness of 20 nm by the spattering method on one surface of a reinforced glass plate having a thickness of 1 mm as a transparent substrate and by cutting off 4-inch rectangular panels (87.3 mm long×64.0 mm wide).

(3) Production of a Spacer

On the surface having a conductive film of the afore-mentioned lower electrode panel, ionizing radiation curable resin (Dot Cure TR5903: Taiyo Ink Mfg. Co., Ltd.) as a coating solution for spacer was printed in a dotted configuration by the screen printing method. Thereafter ultraviolet light was irradiated onto the coating using a high pressure mercury lamp to produce spacers having a diameter of 50 μm and a height of 8 μm arranged in intervals of 1 mm.

(4) Production of a Touch Panel

The above-mentioned upper electrode and lower electrode panels were placed so that the conductive film of each panel faces each other, and then the edges of the panel were joined with a double-faced adhesive tape having a thickness of 30 μm and a width of 3 mm so that the adhered parts are outside the display area. Thus the touch panels of Examples and Comparative Examples were produced.

3. Evaluation

Anti-Newton ring property and transparency of each of the anti-Newton ring sheet thus obtained in Examples and Comparative Examples were evaluated. Sparkle-proof property of each of the touch panels thus obtained in Examples, Comparative Examples and Reference Examples were also evaluated. The results of the evaluation are shown in Tables 1-3.

(1) Anti-Newton Ring Property of the Anti-Newton Ring Sheet

Whether Newton rings are generated or not was visually evaluated, by pressing each of the anti-Newton ring sheets thus obtained in Examples and Comparative Examples to bring each anti-Newton ring layer into close contact with a glass plate having a smooth surface. In the evaluation, "○" indicates the case where no Newton ring was generated. "Δ" indicates the case where only a few Newton rings were generated and "x" indicates the case where Newton rings were generated.

(2) Transparency of an Anti-Newton ring sheet

The haze of each of the anti-Newton ring sheets thus obtained in Examples and Comparative Examples was measured by the a Haze meter (NDH2000: Nippon Denshoku Kogyo Co., Ltd) and evaluated according to JIS K7136:2000. In the evaluation, "○" indicates the case where the measurements were lower than 3.0% and "x" indicates the cases where the measurements were 3.0% or higher. In the measurement, light was made to enter the surface having an anti-Newton ring layer.

(3) Sparkle-proof Property of a Touch Panel

The sparkle-proof property of each of the touch panel thus obtained in Examples and Comparative Examples was visually evaluated by displaying the screen of the CRT display by 100% green and bringing the lower electrode side of the touch panel into close contact with the display screen. In the evaluation, "⊚" indicates the case without glare, "○" indicates the case with virtually no glare, "Δ" indicates the case with some glare, and "x" indicates the case with a lot of glare.

(4) Mar-resistance of an Anti-Newton Ring Sheet

The surface of the anti-Newton ring sheet thus obtained in Examples 4-9 and Comparative Examples 1-4 was scratched by nail and visually observed. In the evaluation, "○" indicates the case where no marring was observed. "x" indicates the case where marring was observed.

TABLE 1

|  | Anti-Newton ring property | Transparency | Anti-sparkle property |
|---|---|---|---|
| Example 1 | ○ | ○ | ⊚ |
| Example 2 | ○ | ○ | ⊚ |
| Example 3 | ○ | ○ | ○ |
| Comparative example 1 | X | ○ | ⊚ |
| Comparative example 2 | X | ○ | X |
| Comparative example 3 | ○ | X | X |

TABLE 2

|  | Anti-Newton ring property | Transparency | Mar-resistance | Anti-sparkle property |
|---|---|---|---|---|
| Example 4 | ○ | ○ | ○ | ⊚ |
| Example 5 | ○ | ○ | ○ | ⊚ |
| Example 6 | ○ | ○ | ○ | ⊚ |
| Example 7 | ○ | ○ | ○ | ⊚ |
| Example 8 | ○ | ○ | ○ | ⊚ |
| Example 9 | ○ | ○ | ○ | ○ |
| Reference Example 1 | X | ○ | Δ | ⊚ |
| Reference Example 1 | ○ | ○ | ○ | Δ |
| Reference Example 1 | ○ | ○ | Δ | Δ |
| Reference Example 1 | X | ○ | ○ | ⊚ |

TABLE 3

|  | Anti-Newton ring property | Transparency | Anti-sparkle property |
|---|---|---|---|
| Example 10 | ○ | ○ | Δ |
| Example 11 | ○ | ○ | Δ |
| Example 12 | ○ | ○ | Δ |
| Example 13 | ○ | ○ | Δ |
| Comparative example 4 | ○ | ○ | X |
| Comparative example 5 | ○ | X | Δ |
| Comparative example 6 | ○ | ○ | X |

As will be clearly understood from the results shown in tables 1 and 2, the anti-Newton ring sheets of Examples 1-3 (First embodiment 1: Table 1), which use hybrid resin compound as a binder component, and the anti-Newton ring sheets of Examples 4-9 (Second embodiment: Table 2), which use ionizing radiation curable resin compound and other resin component, exhibited excellent performances in all evaluation items such as anti-Newton ring property, transparency and anti-sparkle property.

In particular, by using specific binder component and fine particles with a specific diameter and a coefficient of variation and by specifying the thickness of the anti-Newton ring layer, anti-Newton ring sheets with extremely excellent anti-sparkle property were obtained.

Since the anti-Newton ring sheets of Examples 10-13 (third embodiment: Table 3) used ionizing radiation curable resin of non-hybrid type, some fine particles did not gather onto the surface of the anti-Newton ring layer and were often buried in the layer. Accordingly, such sheets have slightly poorer anti-Newton ring property than that of the anti-Newton ring sheets of Examples 1 and 2. However, as it is clearly understood from the comparison with Comparative Examples 4-6, which used ionizing radiation curable resin compound alone as a binder, the anti-Newton ring sheet with anti-Newton ring property, transparency and anti-sparkle property were obtained when the fine particles with a specific diameter and a coefficient of variation were used.

On the other hand, when the fine particles with a large mean diameter (9 μm) were used (Comparative Example 4), the generation of particles could not be suppressed. When the fine particles with a large coefficient of variation (95%) were used (Comparative example 5), though an excellent anti-Newton ring property was obtained, scattering of light increased due to the fine particles with a large particle diameter contained therein and could not obtain adequate anti-sparkle property. When the fine particles with a small coefficient of variation (5%) was used (Comparative example 6), the generation of sparkles could not be suppressed due to uniform scattering of light of displayed image caused by the fine particles.

As it is shown in the results of Table 1, since the thermosetting resin was used as a binder component in the anti-Newton ring sheets of Comparative Examples 1-3, no "undulation" was generated on the surface. When the diameter of the fine particles was small (Comparative Examples 1) and/or the content of the particles was low (Comparative Example 1 and 2), no anti-Newton ring property was obtained. Further, no sparkle occurred in the anti-Newton ring sheet of Comparative Example 1, but the appearance of the sheet was awkward because the contained particles looked like a foreign body. For the anti-Newton ring sheet of Comparative Example 2, since the use of the particles with a large particle diameter increased the diffusion of light of displayed images, the generation of sparkles was not suppressed. Even when thermosetting resin was used as a binder component, good anti-Newton ring property was obtained when a larger amount of particles with a larger particle diameter (Comparative Example 3) were used, but the transparency was reduced. Further, the use of the particles with a larger diameter increased scattering of light of displayed image, and could not suppress the generation of sparkles.

As shown in the results of Table 2, the anti-Newton ring sheet of Reference Examples 1-4 used an ionizing radiation curable resin compound and other resin compound as a binder component. However, for the anti-Newton ring sheet with high content of other resin component (20 weight %) (Reference Example 1), the configuration of "undulation" was moderated excessively and therefore anti-Newton ring property was not obtained. No sparkle was generated, but mar-resistance was poor. When the resin was substituted for that with a lower glass transition temperature while maintaining the high content of other resin component unchanged (Reference example 3), the generation of sparkles could not be suppressed and the anti-marring property was poor, though the anti-Newton ring property was obtained. On the other hand, Reference Example 2, in which the content of other resin component (0.06 weight %) was low, used the particles with a preferred size and coefficient of variations, so that the results were almost identical to that of Example 10 was obtained. When the resin was substituted for that with a higher glass transition temperature (Reference Example 4), the configuration of "undulation" was moderated excessively so that only a small amount of the added resin deteriorated the anti-Newton ring effect.

Example 14

In the same manner as in Example 1, an anti-Newton ring layer was formed on one surface of a polyester film, while a coating solution for a hard coat layer having the following formulation was applied to another surface of the polyester film, dried and irradiated with ultraviolet light using a high pressure mercury vapor lamp to form a hard coat layer having a thickness of about 5 μm. Thus the anti-Newton ring sheet of the present Example 14 was produced.

<Formulation of a Coating Solution for a Hard Coat Layer (A)>

| | |
|---|---|
| Ionizing radiation curable organic-inorganic hybrid resin | 100 parts |
| (Solid content 50%) | |
| (Desolite 7503: JSR Corporation) | |
| Fine particles (Silica) | 5 parts |
| (Mean particle diameter 3.5 μm) (A coefficient of variation 60%) | |
| Methylethyl ketone | 40 parts |
| Toluene | 15 parts |

Example 15

An anti-Newton ring sheet of Example 15 was produced in the same manner as in Example 14 except that the coating solution for a hard coat layer of Example 14 was substituted for the coating solution for a hard coat layer having the following formulation (B).

<Formulation of a Coating Solution for a Hard Coat Layer (B)>

| | |
|---|---|
| Ionizing radiation curable resin | 30 parts |
| (Solid content 100%) | |
| (Diabeam UR6530: Mitsubishi Rayon Co., Ltd.) | |
| Fine particles (Silica) | 1.5 parts |
| (Mean particle diameter 4.5 μm) (Coefficient of variation 60%) | |
| Fine particles (Silica) | 1.5 parts |
| (Mean primary particle diameter 30 nm) | |
| (AEROSIL 50: Nippon Aerosil Co., Ltd.) | |
| Photopolymerization initiator | 0.15 parts |
| (IRGACURE 651 : Ciba Specialty Chemicals) | |
| Methyl ethyl ketone | 40 parts |
| Toluene | 30 parts |

Example 16

In the same manner as in Example 4, an anti-Newton ring layer was formed on one surface of a polyester film, while a coating solution for a hard coat layer having the formulation (A) was applied to other surface of the polyester film, dried and irradiated with ultraviolet light using a high pressure mercury vapor lamp to form a hard coat layer having a thickness of about 5 μm. Thus the anti-Newton ring sheet of the present Example 16 was produced.

Example 17

An anti-Newton ring sheet of Example 17 was produced in the same manner as in Example 16 except that the coating solution for a hard coat layer having the formulation (A) of Example 16 was substituted for the coating solution for a hard coat layer having the formulation (B).

Example 18

As in Example 10, an anti-Newton ring layer was formed on one surface of a polyester film, while a coating solution for a hard coat layer having the formulation (A) was applied to other surface of the polyester film, dried and irradiated with ultraviolet light using a high pressure mercury vapor lamp to form a hard coat layer having a thickness of about 5 μm. Thus the anti-Newton ring sheet of Example 18 was produced.

Example 19

An anti-Newton ring sheet of Example 19 was produced in the same manner as in Example 18 except that the coating solution for a hard coat layer of Example 18 was substituted for the coating solution for a hard coat layer having the formulation (B).

Comparative Example 7

As in Comparative Example 3, an anti-Newton ring layer was formed on one surface of a polyester film, while a coating solution for a hard coat layer having the formulation (A) was applied to other surface. Thus the anti-Newton ring sheet of the Comparative example 7 was produced.

Comparative Example 8

As in Comparative Example 3, an anti-Newton ring layer was formed on one surface of a polyester film, while a coating solution for a hard coat layer having the formulation (B) was applied to other surface. Thus the anti-Newton ring sheet of Comparative Example 8 was produced.

Comparative Example 9

An anti-Newton ring sheet of Comparative Example 9 was produced by forming a hard coat layer on one surface of a polyester film with a coating solution for a hard coat layer having the formulation (A) but no anti-Newton ring layer on other surface.

Comparative Example 10

The anti-Newton ring sheet of Comparative Example 10 was produced by forming a hard coat layer on one surface of a polyester film with a coating solution for a hard coat layer having the formulation (B) but no anti-Newton ring layer on other surface.

Anti-reflection property of the sheet of Examples 14-19 and Comparative Examples 7-10 were evaluated. In the evaluation, each sheet was placed on a black background under a 3-wavelength fluorescent lamp so that the hard coat would be a top layer. "○" indicates the case where no silhouette (contour) of the fluorescent lamp was reflected, "Δ" indicates the case where the silhouette was hardly reflected and "x" indicates the case where the silhouette was clearly reflected. The results of the evaluations are shown in Table 4.

The haze of these sheets according to JIS K7136:2000 are also shown in Table 4. Further, the haze was measured with a light entering the surface having a hard coat layer.

Touch panels were produced by using the sheets of Examples 14-19 and Comparative Examples 7-10 in the same manner as mentioned above, and the anti-sparkle property of the touch panels was evaluated. The same standard as mentioned above was used in the evaluation. Results of the evaluation are also shown in Table 4.

TABLE 4

|  | Anti-reflective property | Haze | Anti-sparkle property |
|---|---|---|---|
| Example 14 | ○ | 9% | ⊚ |
| Example 15 | ○ | 9% | ○ |
| Example 16 | ○ | 9% | ⊚ |
| Example 17 | ○ | 9% | ○ |
| Example 18 | ○ | 9% | Δ |
| Example 19 | ○ | 9% | Δ |
| Comparative example 7 | Δ | 20% | X |
| Comparative example 8 | Δ | 20% | X |
| Comparative example 9 | X | 7% | ⊚ |
| Comparative example 10 | X | 7% | ○ |

As it is clear from the results of Table 4, the anti-Newton ring sheets of Examples 14-19 and Comparative Examples 7 and 8 having an anti-Newton ring layer exhibited a better anti-reflection property than the anti-Newton ring sheets of Comparative Examples 9 and 10 having no anti-Newton ring layer. Further, the sheets of Examples 14-19 having a specific anti-Newton ring layer had better anti-reflection property than the sheet having a conventional anti-Newton ring layer of Comparative examples 7 and 8, due to the synergic effect with the specific anti-Newton ring layer.

As it is also understood from the comparison between Examples 14 and 16 and Examples 15 and 17, the use of hybrid resin for a hard coat layer (a coating solution for a hard coat layer of formulation (A)) could more suppress the generation of sparkles.

However, when a hard coat layer was formed on the conventional anti-Newton ring sheet (Comparative Example 3) (Comparative Examples 7 and 8), and as it is known also from the comparison with the results of anti-sparkle property of Comparative example 3, sparkles were generated on the anti-Newton ring layer, so that no improvement of the anti-sparkle property was observed despite the anti-sparkle property of the hard coat layer.

The invention claimed is:

1. An anti-Newton ring sheet having an anti-Newton ring layer comprising a binder compound and fine particles and formed on one surface of a transparent substrate, wherein said binder compound comprises ionizing radiation curable organic-inorganic hybrid resin and wherein said fine particles are 0.1-1.5 wt % of the total solids content of the anti-Newton ring layer.

2. The anti-Newton ring sheet of claim 1, wherein the content of said fine particles is not less than 0.1 weight % and not more than 1.0 weight % of all solid contents in the anti-Newton ring layer.

3. The anti-Newton ring sheet of claim 1, wherein the mean particle diameter of the fine particles is not less than 0.5 μm and not more than 3.0 μm.

4. The anti-Newton ring sheet of claim 1, wherein the coefficient of variation of the particle diameter distribution of the fine particles is not less than 30% and not more than 80%.

5. The anti-Newton ring sheet of claim 1, wherein the thickness of the anti-Newton ring layer is not less than 0.2 µm and not more than 3.5 µm.

6. The anti-Newton ring sheet of claim 1, wherein a hard coat layer containing particles is formed on other surface of the transparent substrate.

7. The anti-Newton ring sheet of claim 6, wherein the haze according to JIS K7136:2000 is 20% or lower.

8. A touch panel of resistive type comprising a pair of panels coated by a conductive film and arranged via spacer so that the conductive films on both panels face each other, wherein either or both of the conductive films is formed on the anti-Newton ring layer of the anti-Newton ring sheet of claim 1.

9. The anti-Newton ring sheet of claim 2, wherein the mean particle diameter of the fine particles is not less than 0.5 µm and not more than 3.0 µm.

10. The anti-Newton sheet of claim 1, wherein the organic-inorganic hybrid resin is a reaction product of a metal oxide and an organic compound.

11. The anti-Newton sheet of claim 1, wherein the organic-inorganic hybrid resin is a reaction product of silica and an organic compound containing a hydrolysable silyl group as a first group, a polymerizable unsaturated group as a second group, and, as a third group,

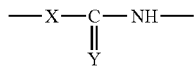

wherein X is NH, oxygen or sulfur, while Y is either oxygen or sulfur; provided, when X is oxygen, Y is sulfur; or

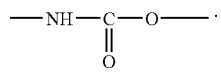

12. The anti-Newton sheet of claim 11 wherein the organic compound contains four of the third group.

13. An anti-Newton ring sheet having an anti-Newton ring layer comprising a binder component and fine particles and formed on one surface of a transparent substrate, wherein the mean diameter of the fine particles is not less than 0.5 µm and not more than 3.0 µm and the coefficient of variation of the particle diameter distribution of the fine particles is not less than 30% and not more than 80% and wherein the binder component comprises a radiation curable resin.

14. The anti-Newton ring sheet of claim 13, wherein the thickness of the anti-Newton ring layer is not less than 0.2 µm and not more than 3.5 µm.

15. The anti-Newton ring sheet of claim 13, wherein a hard coat layer containing particles is formed on other surface of the transparent substrate.

16. The anti-Newton ring sheet of claim 13, wherein the haze according to JIS K7136:2000 is 20% or lower.

17. A touch panel of resistive type comprising a pair of panels coated by a conductive film and arranged via spacer so that the conductive films on both panels face each other, wherein either or both of the conductive films is formed on the anti-Newton ring layer of the anti-Newton ring sheet of claim 13.

18. The anti-Newton ring sheet of claim 13, wherein the binder component comprises a mixture of ionizing radiation curable resin and another resin, different from the ionizing radiation curable resin, and the content of the another resin is not less than 0.1 weight % and not more than 15 weight % of the mixture.

19. The anti-Newton ring sheet of claim 18, wherein another resin is a thermoplastic resin.

20. The anti-Newton ring sheet of claim 18, wherein the glass transition temperature of the another resin is at least 50° C. and not higher than 120° C.

21. A resistive type touch panel comprising a pair of panels coated by a conductive film with a spacer therebetween and the conductive films on the panels facing each other, wherein at least one of the conductive films is formed on the anti-Newton ring layer of the anti-Newton ring sheet of claim 18.

22. A resistive type touch panel comprising a pair of panels coated by a conductive film with a spacer therebetween and the conductive films on the panels facing each other, wherein at least one of the conductive films is formed on the anti-Newton ring layer of the anti-Newton ring sheet of claim 19.

23. A resistive type touch panel comprising a pair of panels coated by a conductive film with a spacer therebetween and the conductive films on the panels facing each other, wherein at least one of the conductive films is formed on the anti-Newton ring layer of the anti-Newton ring sheet of claim 20.

* * * * *